(12) United States Patent
Raghothaman et al.

(10) Patent No.: US 8,259,671 B2
(45) Date of Patent: Sep. 4, 2012

(54) ATTRACTING ACCESS TERMINALS

(75) Inventors: Balaji Raghothaman, Hollis, NH (US); Pierre A. Humblet, Cambridge, MA (US); Vedat Eyuboglu, Concord, MA (US); Woojune Kim, Arlington, MA (US)

(73) Assignee: Airvana, Corp., Chelmsford, MA (US)

( * ) Notice: Subject to any disclaimer, the term of this patent is extended or adjusted under 35 U.S.C. 154(b) by 721 days.

(21) Appl. No.: 11/958,934

(22) Filed: Dec. 18, 2007

(65) Prior Publication Data

US 2009/0156165 A1 Jun. 18, 2009

(51) Int. Cl.
*H04W 4/00* (2009.01)
(52) U.S. Cl. ........ 370/331; 370/321; 370/328; 370/337; 370/338; 370/347; 455/435.1; 455/435.2; 455/436; 455/442; 455/444
(58) Field of Classification Search ................. 455/41.2, 455/127.4, 432.1, 434, 435.1, 435.2, 435.3, 455/436–444, 447–450, 455, 458, 464, 515–517, 455/524, 525, 550.1, 552.1, 574; 370/310, 370/324, 328–332, 335, 338, 341, 342, 320–322, 370/337, 347
See application file for complete search history.

(56) References Cited

U.S. PATENT DOCUMENTS

| | | | |
|---|---|---|---|
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 7,113,783 B2 * | 9/2006 | Jou | 455/434 |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 7,558,356 B2 | 7/2009 | Pollman et al. | |
| 7,558,588 B2 | 7/2009 | To et al. | |
| 7,606,242 B2 * | 10/2009 | Whelan et al. | 370/401 |
| 7,729,697 B2 * | 6/2010 | Scheinert et al. | 455/435.1 |
| 8,145,221 B2 * | 3/2012 | Garg et al. | 455/444 |
| 2002/0196749 A1 | 12/2002 | Eyuboglu et al. | |
| 2003/0100311 A1 | 5/2003 | Chung et al. | |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |

(Continued)

FOREIGN PATENT DOCUMENTS

GB 2452688 3/2009

OTHER PUBLICATIONS

3rd Generation Partnership Project 2 "3GPP2", "cdma2000 High Rate Packet Data Interface Specification", C.S0024, version 2, Oct. 27, 2000 (441 pages).

(Continued)

*Primary Examiner* — Anthony Addy
(74) *Attorney, Agent, or Firm* — Fish & Richardson P.C.

(57) ABSTRACT

Disclosed is a method that includes determining an identifier of an access terminal authorized to use an access point, and transmitting a service redirection message including the identifier. The method also includes transmitting a parameter that instructs the access terminal to wake up during the particular time slot in the repeating interval.

24 Claims, 6 Drawing Sheets

U.S. PATENT DOCUMENTS

Figure 1:
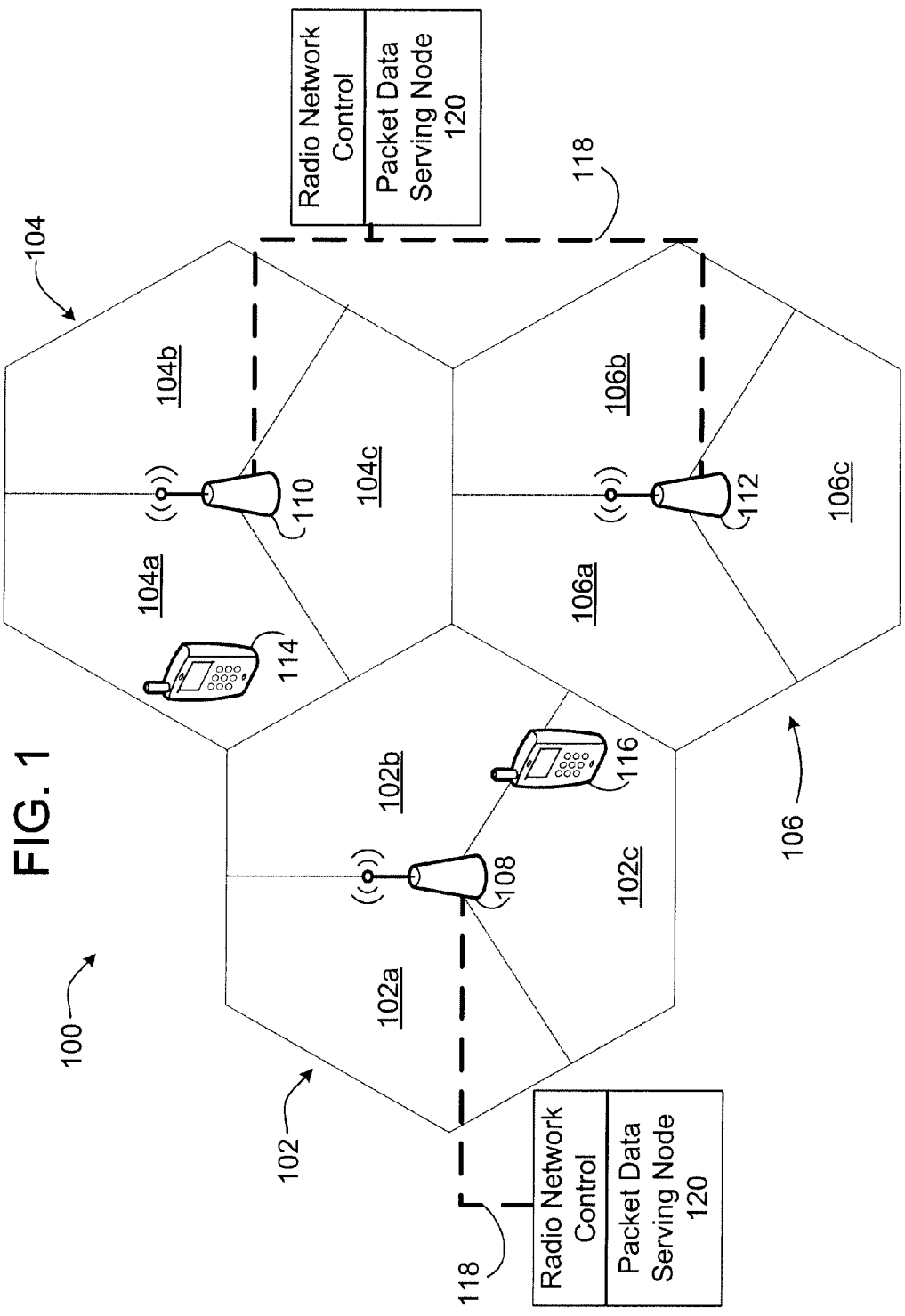

| | | |
|---|---|---|
| 2006/0067451 A1 | 3/2006 | Pollman et al. |
| 2006/0126509 A1 | 6/2006 | Abi-Nassif |
| 2006/0159045 A1 | 7/2006 | Ananthaiyer et al. |
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0137604 A1* | 6/2008 | Lee ............................. 370/330 |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2009/0034440 A1 | 2/2009 | Samar et al. |
| 2009/0059868 A1* | 3/2009 | Rajasimman et al. ........ 370/332 |
| 2009/0082020 A1 | 3/2009 | Ch'ng et al. |
| 2009/0088155 A1 | 4/2009 | Kim |
| 2009/0094680 A1* | 4/2009 | Gupta et al. ...................... 726/3 |
| 2009/0097436 A1* | 4/2009 | Vasudevan et al. ........... 370/328 |
| 2009/0098871 A1* | 4/2009 | Gogic ........................ 455/435.1 |
| 2009/0116445 A1 | 5/2009 | Samar et al. |
| 2009/0154447 A1 | 6/2009 | Humblet |
| 2009/0156165 A1 | 6/2009 | Raghothaman et al. |
| 2009/0156195 A1 | 6/2009 | Humblet |
| 2009/0156218 A1 | 6/2009 | Garg et al. |
| 2009/0163202 A1 | 6/2009 | Humblet et al. |
| 2009/0163216 A1 | 6/2009 | Hoang et al. |
| 2009/0163238 A1 | 6/2009 | Rao et al. |
| 2009/0164547 A1 | 6/2009 | Ch'ng et al. |
| 2009/0168766 A1 | 7/2009 | Eyuboglu et al. |
| 2009/0168788 A1 | 7/2009 | Den et al. |
| 2009/0170440 A1 | 7/2009 | Eyuboglu et al. |
| 2009/0170475 A1 | 7/2009 | Ch'Ng et al. |
| 2009/0170520 A1* | 7/2009 | Jones ........................... 455/439 |
| 2009/0170547 A1 | 7/2009 | Raghothaman et al. |
| 2009/0172169 A1 | 7/2009 | Ch'Ng et al. |
| 2009/0172397 A1 | 7/2009 | Kim |
| 2010/0120437 A1* | 5/2010 | Foster et al. ................. 455/444 |

OTHER PUBLICATIONS

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

$3^{rd}$ Generation Partnership Project 2 (3GPP2), C.S0005-A v5.0, cdma2000 1X Layer 3 specification, Jul. 2001 (1696 pages).

* cited by examiner

ATTRACTING ACCESS TERMINALS

BACKGROUND

This disclosure relates to attracting access terminals.

Cellular wireless communications systems are designed to serve many access terminals distributed in a large geographic area by dividing the area into cells, as shown in FIG. 1. At or near the center of each cell 102, 104, 106, a radio network access point 108, 110, 112, also referred to as a base transceiver station (BTS), is located to serve access terminals 114, 116 (e.g., cellular telephones, laptops, PDAs) located in the cell. Each cell is often further divided into sectors 102a-c, 104a-c, 106a-c by using multiple sectorized antennas. A BTS is identified by one or more of several properties, which may include the phase offset of its pilot signal (PN offset), a frequency, an IP address, or a SectorID. In each cell, that cell's radio network access point may serve one or more sectors and may communicate with multiple access terminals in its cell.

The 1xRTT protocol has been standardized by the Telecommunication Industry Association (TIA) in the TIA-2000.1 through TIA-2000.6 series of specifications, which are incorporated herein by reference.

The 1xEV-DO protocol has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-856-B, 3GPP2 C.S0024-B and is also incorporated herein by reference. Other wireless communication protocols can also be used.

SUMMARY

In general, in one aspect, a method includes determining an identifier of an access terminal authorized to use an access point, and transmitting a service redirection message including the identifier.

The following are embodiments within the scope of this aspect.

The service redirection message is transmitted during a particular time slot of a repeating interval. The method also includes transmitting a parameter that instructs the access terminal to wake up during the particular time slot in the repeating interval.

The method also includes transmitting the service redirection message consecutively in each of several frequencies. Transmitting the message includes transmitting the message within a first beacon signal at a first frequency, and transmitting the message within a second beacon signal at a second frequency.

The service redirection message is transmitted at the same time within each of the first and second beacon signals, relative to the start time of each respective beacon signal. The method also includes receiving a registration request from the access terminal, and providing network access to the access terminal. The identifier is a mobile station identification number, for example, an IMSI. The identifier is stored in a memory of the access point. The service redirection message instructs the access terminal to operate on a frequency used by the access point. The method also includes transmitting a second service redirection message including an identifier of a second access terminal not authorized to use the access point.

The second message is transmitted in response to receiving a registration request from the second access terminal, the request including the identifier of the second access terminal. The second message instructs the second access terminal to operate on a frequency used by a second access point.

In another aspect, an apparatus includes an access point including a processor and a memory, the processor programmed to determine an identifier of an access terminal authorized to use an access point, and transmit a service redirection message including the identifier.

The following are embodiments within the scope of this aspect.

The processor is also programmed to transmit a parameter that instructs the access terminal to wake up during the particular time slot in the repeating interval. The service redirection message is transmitted consecutively in each of several frequencies. The processor is also programmed to transmit the service redirection message within a first beacon signal at a first frequency, and transmit the service redirection message within a second beacon signal at a second frequency. The service redirection message is transmitted at the same time within each of the first and second beacon signals, relative to the start time of each respective beacon signal. The processor is also programmed to receive a registration request from the access terminal, and provide network access to the access terminal.

The processor is also programmed to transmit a second service redirection message including an identifier of a second access terminal not authorized to use the access point. The second message is transmitted in response to receiving a registration request from the second access terminal, the request including the identifier of the second access terminal. The second message instructs the second access terminal to operate on a frequency used by a second access point. The access point comprises a private access point.

In another aspect, a computer readable medium includes instructions to cause an access point to determine an identifier of an access terminal authorized to use an access point, and transmit a service redirection message including the identifier.

The following are embodiments within the scope of this aspect.

In some embodiments within the scope of this aspect, the medium includes instructions in which the service redirection message is transmitted during a particular time slot of a repeating interval. Also, the medium includes instructions to also cause an access point to transmit a parameter that instructs the access terminal to wake up during the particular time slot in the repeating interval.

In another aspect, a method includes, at an access terminal, receiving a service redirection message, locating an identifier of the access terminal in the service redirection message, and changing a mode of operation based on the service redirection message.

The following are embodiments within the scope of this aspect.

Receiving the service redirection message includes waking up for a period of time including a particular time slot of a repeating interval, and receiving the service redirection message. The method also includes receiving an instruction to wake up during the particular time slot in the repeating interval. Changing the mode of operation comprises operating on a frequency and PN offset specified by the service redirection message. The method also includes requesting registration with an access point that transmitted the service redirection message.

In another aspect, an apparatus includes an access terminal including a processor programmed to receive a service redirection message, locate an identifier of the access terminal in the service redirection message, and change a mode of operation based on the service redirection message.

In another aspect, a method of directing a selected access terminal to use a particular access point, includes transmitting a service redirection message formatted according to a 1xRTT protocol specification for a global service redirection message, the service redirection message being addressed specifically to the access terminal.

In another aspect, a method includes, receiving, at an access terminal, a first beacon signal from a first access point having a service redirection message including an identifier, and switching the access terminal to a operating frequency of the first access point if, based on the identifier, the access terminal is authorized to use the first access point.

In embodiments within the scope of this aspect, the method of claim also includes receiving a second beacon signal from a second access point, having a substantially similar timing pattern as the first beacon signal, and switching the access terminal to at least one of the first access point and the second access point based on the service redirection message. The method of claim also includes receiving a second beacon signal from a second access point, the second beacon signal and the first beacon signal being staggered in time, and reusing a PN offset corresponding to the first beacon signal as a PN offset for the second beacon signal.

Implementations may include one or more of the following features. Advantages include increased efficiency. Overhead messaging is reduced because the macro network need not attract unwanted access terminals and then redirect them back to the macro base stations. Precise timing of unicast messages based on the access terminals' identities improves the efficiency of the beacon signals by reducing its duty cycle while also improving the time taken by the access terminals to perform idle handoff.

Other features and advantages of the invention will be apparent from the description and the claims.

DESCRIPTION

Figure 2:
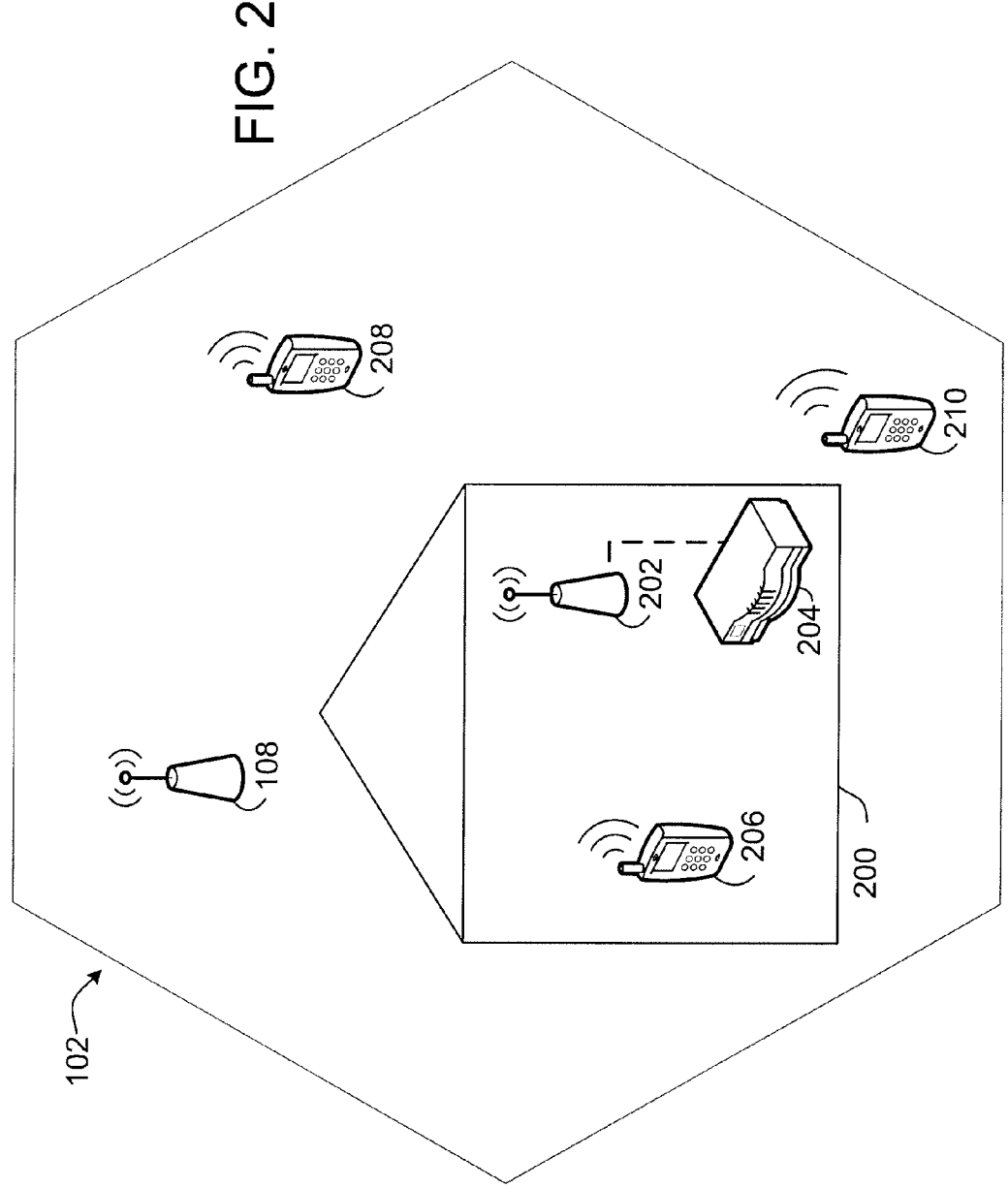
Figure 3:
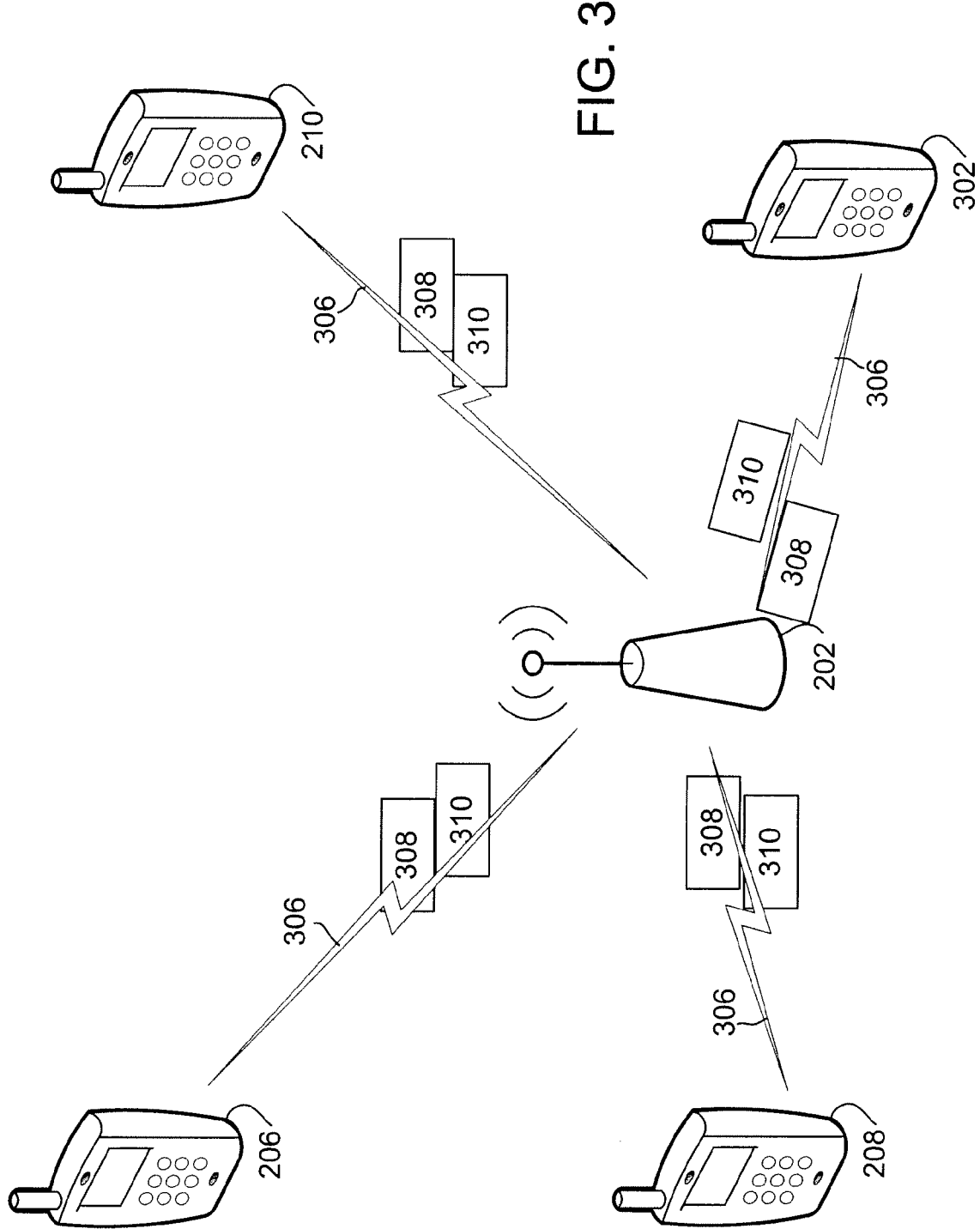
Figure 4:
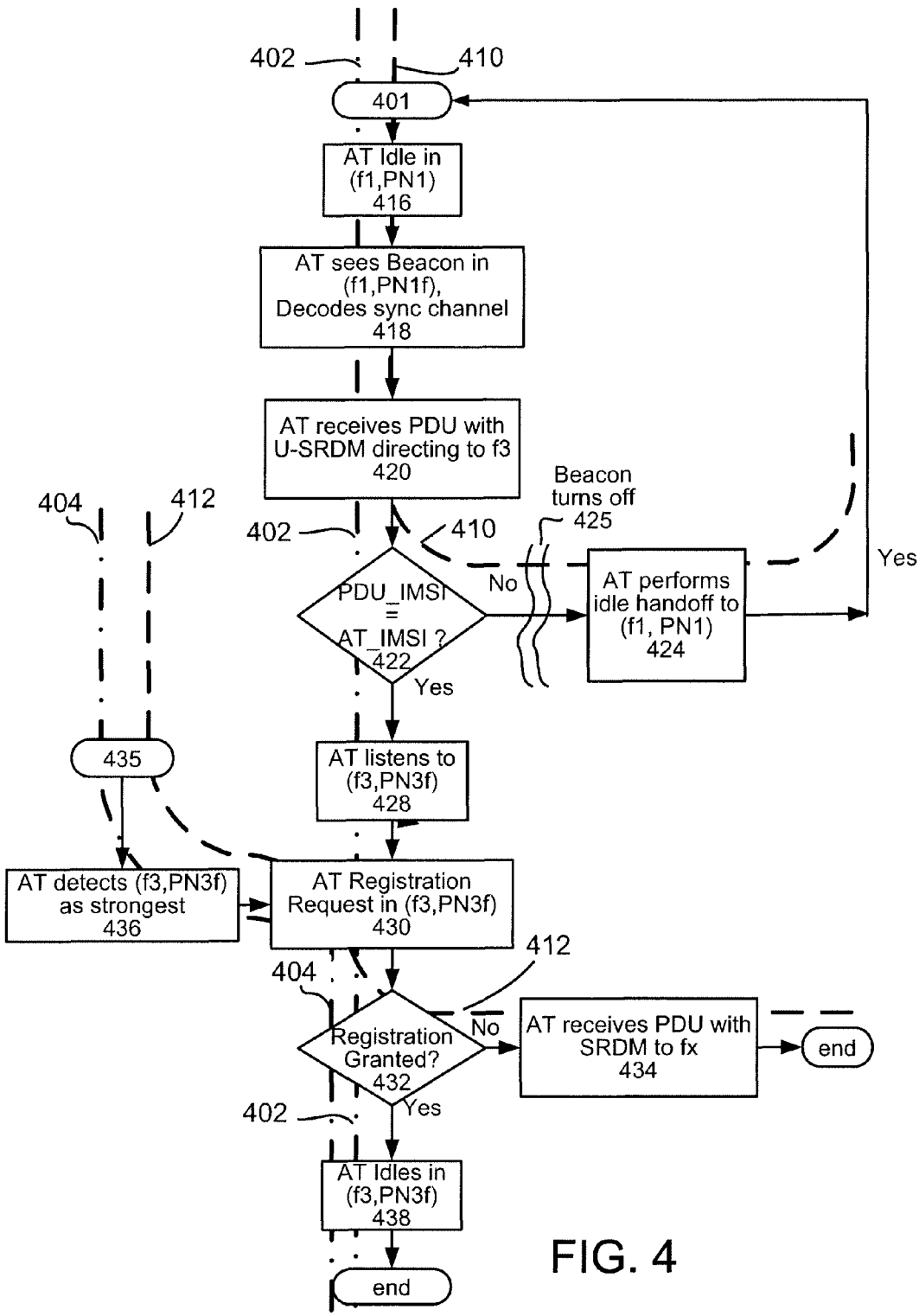
Figure 5A:
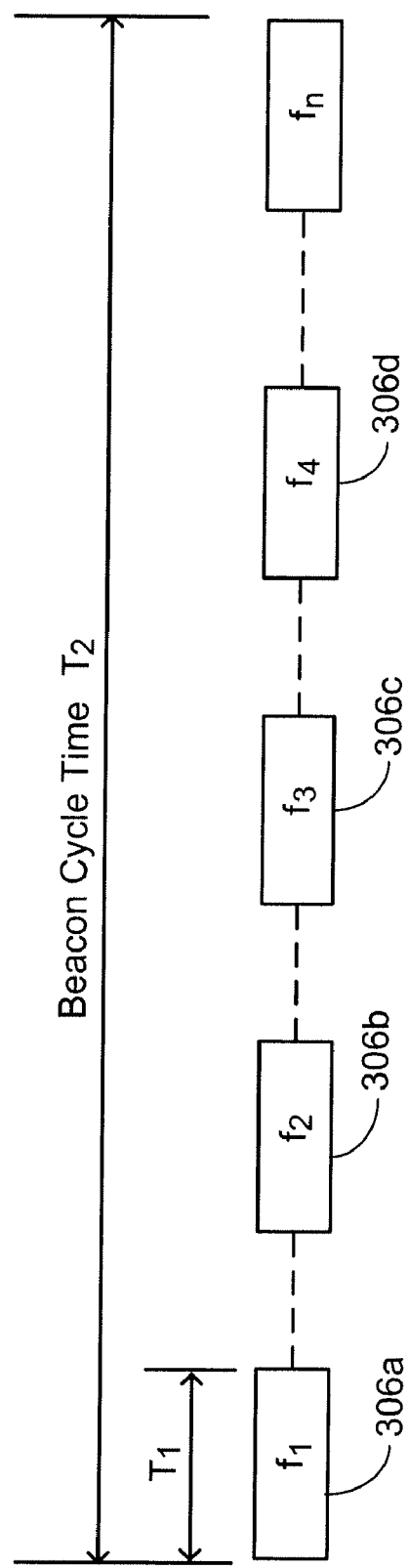
Figure 5B:
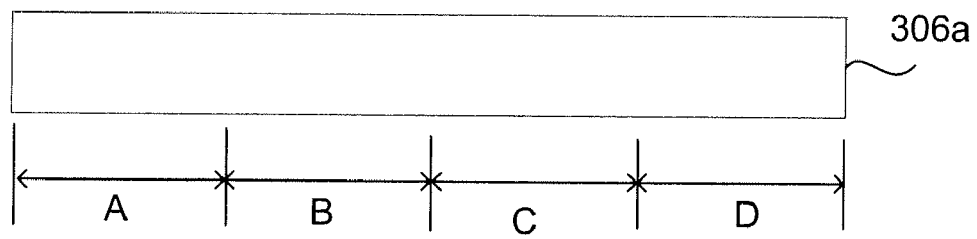
Figure 5C:
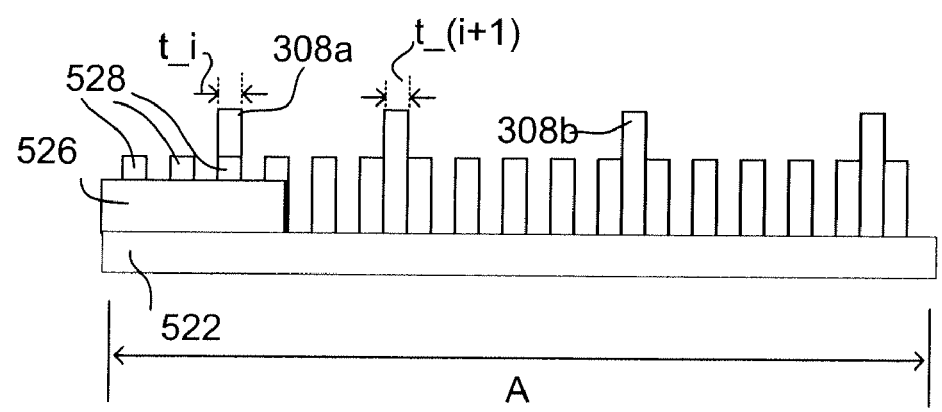

FIGS. 1, 2, and 3 show block diagrams of a radio network.
FIG. 4 shows a flow chart.
FIGS. 5A-5C show messages.

Referring to FIG. 1, a radio access network (RAN), or a macro network 100 uses a 1xRTT or EV-DO protocol to transmit voice or data packets, respectively, between an access terminal, e.g., access terminals 114 and 116, and radio network access points, e.g., access points 108, 110, 112 (generally 108). In the 1xRTT protocol, the access terminals are generally referred to as mobile stations. Both access terminals and mobile stations are within the scope of this disclosure.

The access points 108 are connected over a backhaul connection 118 to radio network control/packet data serving nodes (RNC/PDSN) 120, which may be one or more physical devices at different locations. Although this description uses terminology from CDMA standards (including 1xRTT, Ev-DO, and cdma2000), the same concepts are applicable to other communication methods, including GSM, UMTS, HSDPA, LTE, WiMax, WiBro, or WiFi.

As shown in FIG. 2, in some examples, a user's home 200 can be within a cell 102 of the macro network 100 (FIG. 1). Accordingly, access terminals, e.g., access terminals 206, 208 and 210 (generally 206) are generally deployed within the cell 102. A radio network access point 202 can be installed in the user's home 200 in a similar manner as a WiFi® access point. Such a radio network access point 202 is referred to as a private access point or a femto access point.

The private access point 202 can use an available high-speed internet connection, such as DSL or cable modem 204, as the backhaul with part of the RNC/PDSN functionality implemented in the private access point 202. Such a private access point 202 can be installed anywhere that it is advantageous to do so, for example, in an office, a public space, or a private residence. When this description refers to a private access point being in a "home," that encompasses any such location.

One respect in which a private access point 202 can be considered different from a picocell access point, i.e., an access point that is typically deployed in a similar manner as a private access point 202, is that the private access point 202 is generally intended to provide access only for the user who installs it in his home or those he authorizes, while a picocell serves a similar venue but provide access to any subscriber of the network. In some examples, a private access point 202 can be integrated into a cable modem or other network hardware, such as a router or WiFi access point.

When an authorized access terminal 206 is present inside the home 200 (or anywhere within range of the private access point 202, e.g. an access terminal 208 near the home 200), it can use the private access point 202 rather than a regular cellular radio network access point such as access point 108 to place or receive voice calls and data connections, even if the access terminal 206 is otherwise within the cell 102 for that access point 108.

An unauthorized access terminal, e.g., an access terminal 210, is not permitted to use the private access point 202 even though the private access point 202 can provide a better signal to the access terminal 210 than the access point 108. We sometimes refer to the standard access point 108 as a macro access point or macro BTS (base transceiver station) to distinguish it from the private access point 202, as it provides direct access to the RAN 100 (FIG. 1).

The private access points 202 can be deployed in a number of carrier configurations. In some examples, the private access points 202 operate at a frequency that is different from the frequency at which a macro BTS 108 operates. We refer to the frequency at which the macro BTS 108 operates as the macro frequency, and the frequency at which a private access point 202 operates as the femto frequency. In such a configuration, each private access point 202 needs a way to attract access terminals 206 that are currently operating on the macro network 100 and that have an air link with the private access point 202 that is strong enough for proper operation. In addition, it is more efficient to attract only those access terminals that are authorized to use the private access point 202 in question than to attract all nearby access terminals.

Typically, an access terminal 206 is attracted to a target private access point 202 by a beacon signal, e.g., beacon signal 306 in FIG. 3, transmitted at the macro frequency. The beacon signal is sent periodically for short periods of time. In a typical beacon signal, a global service redirection message (global SRDM, or GSRDM) is transmitted at the macro frequency that directs all access terminals 206 to use the femto frequency.

Subsequently, any access terminal 206, 208 or 210, receiving the GSRDM attempts to access the target private access point 202, but only an authorized access terminal, e.g., access terminals 206, is allowed to do so. Unauthorized access terminals, e.g., access terminals 208, 210, are either redirected back to the macro frequency or go back to the macro frequency themselves though a process of system determination.

In some examples, as shown in FIG. 3, the private access point 202 uses unicast service redirection messages (unicast SRDMs), e.g., unicast SRDMs 308, 310), to attract only authorized access terminals, e.g., access terminals 206, 302. The private access point 202 periodically transmits a beacon signal 306 at the macro frequency.

The access point 202 transmits the unicast SRDMs 308, 310 as part of its periodic beacon signal 306 transmission. The unicast SRDMs 308 and 310 are transmitted to all access terminals 206. However, the unicast SRDMs 308 and 310 are addressed to only the authorized access terminals 302 and 304, respectively, and are not addressed to the unauthorized access terminals 208 and 210.

Transfer of an access terminal 206 from one access point 202 to another is typically referred to as handoff. We distinguish two types of handoffs from a macro BTS 108 to a private access point 202, based on the state of the access terminal 206 at the time of the handoff. We refer to idle handoff, in which the access terminal 206 does not have an active voice or data call, as rove-in. We refer to active handoff, in which the access terminal 206 does have an active call or data call, as hand-in.

According to the cdma2000 1x Layer 3 specification, an SRDM message, e.g., unicast SRDM 308 or 310, is sent on a logical forward common signaling channel (f-csch) or forward dedicated signaling channel (f-dsch) and can be transmitted over the physical paging channel (PCH) or forward link common control channel (F-CCCH). The unicast SRDMs 308, 310 are typically addressed to authorized access terminals 206, 302, based on the access terminal's 206, 302 mobile subscriber identity (IMSI). In some examples, the private access point 202 knows the IMSI of each of the authorized access terminals 206, 302, e.g., each of the phones and PDAs that are part of a home plan, or within an office network.

In some examples, the unicast SRDMs 308, 310 are implemented for a network by 1xRTT protocols using a process 400 shown in FIG. 4. In general, a macro BTS's 108 frequency and PN-offset pair are denoted as (fx, PNx). A private access point's 202 frequency and PN-offset pair are denoted as (fx, PNxf). In this notation, fx denotes the carrier frequency, PNx denotes the pseudonoise (PN) offset of a macro BTS 108, and PNxf denotes the PN offset of a private access point 202. Thus, in the example of FIG. 4, a selected macro BTS's 108 operational frequency and PN-offset pair is (f1, PN1), and a selected private access point's 202 operational frequency and PN-offset is (f3, PN3f).

The private access point 202 transmits its beacon signal 306 on a selected frequency and PN offset pair, e.g., (f1, PN1f), so that access terminals 206 on the macro network 100 using the same frequency f1 will receive it. In the flow chart 400, dashed lines 402 and 404 indicate the progress of an authorized access terminal, e.g. access terminal 206, and dashed lines 410 and 412 indicate the progress of an unauthorized access terminal, e.g., access terminal 208.

In a first scenario 401, all access terminals 206 are idle 416 on the macro network 100 using (f1, PN1). The access terminals 206 then detect 418 a beacon signal 306 in (f1, PN1f), alerting the access terminals 206 to the presence of the private access point 202, and switch to monitoring the beacon signal 306.

In some examples, the access terminals 206 receives 420 a payload data unit (PDU) including a unicast SRDM, e.g., unicast SRDM 308, directing a change from the frequency f1 corresponding to (f1, PN1f) to the frequency f3. In some situations, the frequency f3 corresponds to (f3, PN3f) that has the PN offset, PN3f, of the strongest signal at the frequency f3. The access terminals then each evaluate 422 whether the IMSI in the unicast SRDM 308 matches their own.

Along path 410, an unauthorized access terminal 208, finds that there is no match. As a result, the beacon signal 306 turns off 425. The access terminal 208 then performs 424 an idle hand-off to (f1, PN1). In this manner, the access terminal 208 is returned to the macro network 100, i.e., returned to the beginning of the process 400.

Along path 402, on the other hand, an authorized access terminal 206, finds a match to its IMSI in the unicast SRDM 308. Accordingly, the access terminal 206 proceeds to switch 428 to a new frequency and PN offset pair, i.e., (f3, PN3f). The access terminal 206 then requests 430 to be registered with the private access point 202.

If the private access point 202 grants 432 registration, the access terminal 206 assumes an idle state 438 at the selected frequency and PN offset pair, (f3, PN3f). In some situations, the private access point 202 does not grant registration to the access terminal 206. In such situations, the access terminal 206 receives another PDU with a unicast SRDM, e.g., 310 directing it to another frequency, fx.

In another scenario 435, the access terminals 210 and 302 detect 436 that a predetermined frequency and PN offset pair, e.g., (f3, PN3f), is the strongest frequency within range. This may happen, for example, if the access terminals 206 are turned on at a location served by the private access point 202, where the (f3, PN3f) signals are stronger than, for example, (f1, PN1) signals from a macro BTS 108 in the macro network 100.

Accordingly, the access terminals 210 and 302 request 430 to be registered without waiting for the unicast SRDMs 308, 310. In some examples, there are no unicast SRDMs 308, 310 on the service frequency, i.e., the macro frequency. This is different from scenario 401 in which the access terminals 206 and 208 were sent beacon signals 306 having unicast SRDMs 308, 310 with authorized access terminal IMSIs.

Along path 404, the authorized access terminal 302 has its request granted 432 and idles 438 on the selected frequency and PN offset pair, (f3, PN3f). Along path 41, the unauthorized access terminal 210 has its request rejected or may receive a PDU from the private access point 300 including a unicast SRDM 308 directing it to change to a predetermined macro frequency, e.g., fi.

In some examples, the private access point 202 knows what macro BTS 108 the access terminal 210 is configured to use and redirects the access terminal 210 to that macro BTS's 102 frequency and PN offset pair, e.g., (f1, PN1). In some examples, the private access point 202 is configured to direct the access terminal 210 to a predetermined frequency and PN offset pair corresponding to a predetermined sector 102.

In some systems, an SRDM requires an acknowledgement (ACK). Accordingly, in some examples, to accommodate for a private access point 202 that does not have listening capability on the reverse link frequency paired to the frequency used for the beacon signal 306, the ARQ_REQ bits in the PDU containing the SRDM are disabled so that an access terminal 206 receiving the SRDM does not send an ACK.

In some examples, the process 400 has an efficiency that is comparable to a process that, for example, broadcasts a GSRDM, because the process 400 attracts only authorized access terminals 206, 302 and does not attract unauthorized access terminals 208, 210. This reduces overhead messaging in the macro network 100 by not attracting unwanted access terminals and then having to redirect the access terminals back to a macro BTS 108.

In the idle state, an access terminal 206 periodically wakes up at predetermined times to listen for messages targeted to the access terminal 206. In some examples, at the predetermined times, the access terminal 206 also updates its knowledge of its environment.

In some examples, as shown in FIGS. 5A-C, a unicast SRDM message, e.g., unicast SRDM 308a or unicast SRDM 308b, is timed to be synchronized to the wake-up time of an authorized access terminal 206. This reduces the duty cycle of the beacon signal 306 while improving the time taken by each access terminal 206 to perform idle handoff to the private access point 202.

In some examples, as shown in FIG. 5A, an access terminal 206 transmits a beacon signal 306 periodically. For example, beacon signal intervals 306a-d occur every 5.12 seconds. The beacon signal intervals 306a-d are referred to as the ON state of the beacon signal 306. Each of the beacon signal intervals 306a-d are further comprised of a predetermined number of intervals, e.g., 4 intervals of 1.28 seconds each, denoted by A, B, C, and D in FIG. 5B.

In some examples, the pilot and sync channels 522 are transmitted continuously during a beacon signal interval, .g., 306a. Accordingly, the pilot and sync channels 522 are transmitted continuously during the entire period denoted by the intervals A-D for the beacon signal 306a.

In some examples, a configuration message 526, such as, for example, a system parameters message, an access parameters message, a neighbor list message, or a CDMA channel list message, is transmitted at the beginning of each interval A, B, C, and D. In some implementations, the configuration message 526 can include a combination of more than one of the above messages.

In some examples, a SLOT_CYCLE_INDEX parameter is set in the configuration message 526 so that an access terminal 206 is required to wake-up every 1.28 s. In implementations where no configuration message 526 is transmitted, a periodic general paging message 528 is transmitted. In some examples, the periodic paging message 528 and the configuration message 526 are transmitted simultaneously in the same time slot.

In some examples, the unicast SRDMs 308a-b for individual access terminals 206 are transmitted at predetermined times that the access terminals 206 are expected to wake up. Accordingly, as shown in FIG. 5C, an idle access terminal 206 (e.g., $AT_i$) wakes up at some point in its assigned 80 ms paging channel slot, e.g., during a time slot $t_{-i}$ corresponding to an unicast SRDM 308a.

Each unicast SRDM 308a-b is repeated in one or more of the intervals A, B, C, D. In some examples, the unicast SRDMs 308a-b for an access terminal 206 waking up in a slot t_i, i.e., ATi, is transmitted in the next successive slot, i.e., slot t_(i+1), since the access terminal 206 will remain awake for at least two slots. This is advantageous in situations where the number of access terminals 206 waking up in a predetermined time interval is greater than the number of unicast SRDMs 308 that can be accommodated in the time interval. Also, in case of overload, the number of 1.28 s periods, e.g., A, B, C and D, can be extended to accommodate all the access terminals 206 that need to be redirected.

As described above, in some examples, a private access point 202 has prior knowledge of authorized access terminals' 206, 302 identities. Accordingly, the private access point 202 is able to compute the access terminals' 206 wake-up times accurately.

The timings of the beacon signals are further coordinated for private access points located next to each other. In some examples, a beacon signal 306 corresponding to a selected private access point, e.g., private access point 202, has an identical timing pattern as a beacon signal corresponding to another private access point (not shown). Accordingly, an unauthorized access terminal 206 in the vicinity of the private access point 202 sees both beacon signals simultaneously and will attempt to rove-in to only one of the private access points, for example, private access point 202.

In some examples, the beacon signals corresponding to two or more adjacent private access points are staggered in time, i.e., the beacon signals do not overlap. This makes the operation of the private access points possible even when there is a constraint on the availability of PN offsets for the beacons signals. Accordingly, in these examples, adjacent private access points would reuse the same PN offset for the beacon signals, since the beacon signals do not overlap in time.

The method described above relates to the cdma2000 1xRTT standard. It can also be tailored other wireless standards. For example, the method can be adapted to the 1xEv-DO system if the identity of the access terminal in the DO system, namely its UATI (universal access terminal identifier) can be ascertained. In contrast to the 1xRTT system in which the IMSI used for unicast addressing is a permanent value associated with a specific access terminal, in the DO standard, the UATI is a temporary identity that changes with every session. Thus, some additional steps are taken to find the UATI of the authorized access terminals. Once the UATI is available to the private access point, the private access point can transmit the unicast redirect message to a DO access terminal.

Although the techniques described above employ the 1xRTT and cdma2000 air interface standard, the techniques may also be applicable to other CDMA and non-CDMA air interface technologies in which messaging can be used to communicate information, including 1xEv-DO, WCDMA, (including HSDPA, HSUPA, HSPA), and LTE.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims and other claims to which the applicant may be entitled. The following are examples for illustration only and do not limit the alternatives in any way. The techniques described herein can be performed in a different order and still achieve desirable results Other implementations are within the scope of the following claims and other claims to which the applicant may be entitled.

What is claimed is:

1. A method performed by an access point comprising:
obtaining an identifier of an access terminal authorized to use the access point, the identifier being obtained from a set of identifiers of access terminals authorized to use the access point that are stored on the access point;
identifying a time slot during which the access terminal will wake from an idle state, the time slot being identified based on stored information about the access terminal;
determining that the time slot can accommodate a service redirection message based on a number of access terminals scheduled to wake during a time interval comprising the time slot; and
transmitting, by unicast, a service redirection message comprising the identifier of the access terminal, the service redirection message being unicast to the access terminal during a time that corresponds to the time slot.

2. The method of claim 1, wherein the service redirection message is transmitted in a time division multiplexing manner in each of several frequencies.

3. The method of claim 2, wherein transmitting the service redirection message comprises
transmitting the service redirection message within a first beacon signal at a first frequency; and
transmitting the service redirection message within a second beacon signal at a second frequency.

4. The method of claim 3, wherein the service redirection message is transmitted at a same time within each of the first and second beacon signals relative to a start time of each respective beacon signal.

5. The method of claim 1, further comprising:
receiving a registration request from the access terminal; and
providing network access to the access terminal.

6. The method of claim 1, wherein the identifier comprises a mobile subscriber identity.

7. The method of claim 1, wherein the identifier is stored in a memory of the access point.

8. The method of claim 1, wherein the service redirection message instructs the access terminal to operate on a frequency used by the access point.

9. The method of claim 1, further comprising:
transmitting a second service redirection message comprising an identifier of a second access terminal not authorized to use the access point.

10. The method of claim 9, wherein the second service redirection message is transmitted in response to receiving a registration request from the second access terminal, the registration request comprising the identifier of the second access terminal.

11. The method of claim 9, wherein the second service redirection message instructs the second access terminal to operate on a frequency used by a second access point.

12. An apparatus comprising:
an access point comprising a processor and a memory, the processor being programmed to:
obtain an identifier of an access terminal authorized to use the access point, the identifier being obtained from a set of identifiers of access terminals authorized to use the access point that are stored on the access point;
identify a time slot during which the access terminal will wake from an idle state, the time slot being identified based on stored information about the access terminal;
determine that the time slot can accommodate a service redirection message based on a number of access terminals scheduled to wake during a time interval comprising the time slot; and
transmit, by unicast, a service redirection message comprising the identifier of the access terminal, the service redirection message being unicast to the access terminal during a time that corresponds to the time slot.

13. The apparatus of claim 12, wherein the processor is also programmed to transmit the service redirection message consecutively in each of several frequencies.

14. The apparatus of claim 12, wherein the processor is also programmed:
to transmit the service redirection message within a first beacon signal at a first frequency; and
to transmit the service redirection message within a second beacon signal at a second frequency.

15. The apparatus of claim 14, wherein the service redirection message is transmitted at a same time within each of the first and second beacon signals relative to a start time of each respective beacon signal.

16. The apparatus of claim 12, wherein the processor is also programmed to receive a registration request from the access terminal and to provide network access to the access terminal.

17. The apparatus of claim 12, wherein the identifier comprises a mobile subscriber identity.

18. The apparatus of claim 12, wherein the identifier is stored in a memory on the access point.

19. The apparatus of claim 12, wherein the service redirection message instructs the access terminal to operate on a frequency used by the access point.

20. The apparatus of claim 12, wherein the processor is also programmed to transmit a second service redirection message comprising an identifier of a second access terminal not authorized to use the access point.

21. The apparatus of claim 12, wherein the second service redirection message is transmitted in response to receiving a registration request from the second access terminal, the registration request comprising the identifier of the second access terminal.

22. The apparatus of claim 21, wherein the second service redirection message instructs the second access terminal to operate on a frequency used by a second access point.

23. The apparatus of claim 12, wherein the access point comprises a private access point.

24. One or more non-transitory machine-readable storage media comprising instructions that are executable to cause an access point to:
obtain an identifier of an access terminal authorized to use the access point, the identifier being obtained from a set of identifiers of access terminals authorized to use the access point that are stored on the access point;
identify a time slot during which the access terminal will wake from an idle state, the time slot being identified based on stored information about the access terminal;
determine that the time slot can accommodate a service redirection message based on a number of access terminals scheduled to wake during a time interval comprising the time slot; and
transmit, by unicast, a service redirection message comprising the identifier of the access terminal, the service redirection message being unicast to the access terminal during a time that corresponds to the time slot.

* * * * *

UNITED STATES PATENT AND TRADEMARK OFFICE
CERTIFICATE OF CORRECTION

PATENT NO. : 8,259,671 B2
APPLICATION NO. : 11/958934
DATED : September 4, 2012
INVENTOR(S) : Balaji Raghothaman et al.

It is certified that error appears in the above-identified patent and that said Letters Patent is hereby corrected as shown below:

Column 11, Line 23, In Claim 18, after "in" delete "a".

Signed and Sealed this
Twenty-seventh Day of November, 2012

David J. Kappos
*Director of the United States Patent and Trademark Office*